United States Patent [19]

Naganawa et al.

[11] Patent Number: 5,401,801
[45] Date of Patent: Mar. 28, 1995

[54] AQUEOUS SILICONE EMULSION HAVING UTILITY AS A MOLD RELEASE

[75] Inventors: Tsutomu Naganawa; Isao Ona, both of Chiba, Japan

[73] Assignee: Dow Corning Toray Silicone Co., Ltd., Tokyo, Japan

[21] Appl. No.: 43,238

[22] Filed: Apr. 6, 1993

[30] Foreign Application Priority Data

Apr. 13, 1992 [JP] Japan .................. 4-119736

[51] Int. Cl.$^6$ .................. C08K 5/01; B01J 13/00
[52] U.S. Cl. .................. 524/745; 524/863; 524/860; 524/837; 524/747; 524/755; 524/773; 524/762; 524/748; 252/312
[58] Field of Search .................. 524/863, 860, 837, 747, 524/755, 773, 762, 745, 748; 252/312

[56] References Cited

U.S. PATENT DOCUMENTS

| | | | |
|---|---|---|---|
| 3,505,265 | 4/1970 | Teot et al. | 524/747 |
| 4,495,332 | 1/1985 | Shiiki et al. | 524/837 |
| 4,534,928 | 8/1985 | Martin | 524/860 |
| 4,567,231 | 1/1986 | Huebner et al. | 524/837 |
| 4,568,718 | 2/1986 | Huebner et al. | 524/837 |
| 4,784,844 | 11/1988 | Thimineur et al. | 424/65 |
| 4,970,251 | 11/1990 | Hsieh | 524/747 |

FOREIGN PATENT DOCUMENTS

| | | |
|---|---|---|
| 166397 | 1/1986 | European Pat. Off. . |
| 202679 | 11/1986 | European Pat. Off. . |
| 752660 | 7/1956 | United Kingdom . |

OTHER PUBLICATIONS

Japanese Industrial Standard, Steel Balls for Ball Bearings, JIS B1501, 1988.
Japanese Industrial Standard, Testing Method for Load Carrying Capacity of Lubricating Oil, JISK 2519, 1987.
13501, 1978 Japanese Abstract.
Derwent Publications Ltd., London, GB;; AN 90-351880 JP 253,836.
Patent Abstracts of Japan; vol. 11, No. 80; Mar. 11, 1987 titled Hydrophilic Film-Forming Aqueous Composition.

*Primary Examiner*—Melvyn I. Marquis
*Assistant Examiner*—Karen A. Dean
*Attorney, Agent, or Firm*—Arnie R. Jarnholm

[57] ABSTRACT

There is disclosed a novel silicone emulsion useful as a mold coating in aluminum die casting operations. The silicone emulsion of the invention comprises an aqueous dispersion of an organopolysiloxane of a particular general formula in combination with an alkyl diphenyl ether disulfate salt. The novel silicone emulsion of the invention exhibits stability even when diluted tens of times and subjected to mechanical shear. When applied to a heated mold surface, water is driven from the silicone emulsion and there is formed a oil film. The oil film allows for easy release of the cast part. Furthermore, the film exhibits good paintability and lubricity under extreme pressure.

8 Claims, No Drawings

AQUEOUS SILICONE EMULSION HAVING UTILITY AS A MOLD RELEASE

BACKGROUND OF THE INVENTION

1. Field of the Invention

The present invention relates generally to silicone emulsions and more specifically to a silicone emulsion composition that is useful as a mold release coating in aluminum die casting.

2. Description of the Prior Art

Silicone emulsion compositions prepared by dispersing organopolysiloxanes uniformly in water with the aid of an emulsifier are widely used as fiber processing agents, mold releasing agents, paint additives, and cosmetic feed materials. Examples of this type of silicone emulsion composition include a silicone emulsion composition made from an aqueous emulsion of dimethylpolysiloxane and polyoxyethylene alkyl phenyl ether sulfuric acid sodium (see Japanese Kokoku Patent No. Sho 53[1978]-13501) and emulsions made from cyclic methylpolysiloxane, emulsifier, and water (see, for instance, Japanese Kokai Patent Application No. Sho 56[1981]-95952.)

Conventional silicone emulsion compositions such as those described above suffer from the drawback that they have a poor mechanical stability. That is to say that under mechanical shear, the emulsion form is easily damaged. For example, when these silicone emulsion compositions are used as a mold release in an aluminum die-casting operation, the silicone emulsion composition is generally diluted several tens of times with water. The diluted solution is fed from a reservoir by a gear pump and sprayed onto the surface of a mold. The water in the emulsion is evaporated therefrom to form a uniform oil film of organopolysiloxane on the surface of the mold. Excess amounts of the diluted solution are recovered for recycling, being fed back by a gear pump. In this repeated liquid feed method, emulsion damage takes place, and it is thereafter impossible to uniformly coat the mold.

The oil film produced by the aforementioned conventional silicone emulsion compositions has an additional drawback in that has a poor paintability. Consequently, when these silicone emulsion compositions are used as a mold releasing agent, the oil film adheres to the surface of the die-cast part and makes painting or marking the part very difficult.

Finally, the oil film produced by the prior art silicone emulsion compositions has a low strength and hence, it has poor lubricity under extreme-pressure. Consequently, when these silicone emulsion compositions are used as a mold releasing agent in aluminum die-cast molding, cracks often form in the oil film produced therefrom. Such cracks cause the aluminum melt to misrun, which produces surface defects in the die cast part.

BRIEF SUMMARY OF THE INVENTION

In accordance with the present invention there is provided a silicone emulsion composition useful as a mold coating in aluminum die casting operations. The silicone emulsion composition of the invention has high mechanical stability and, upon removal of water therefrom, forms an oil film with excellent paintability and extreme-pressure lubricating properties.

The silicone emulsion composition of the invention comprises: (A) an aqueous emulsion of an organopolysiloxane; and (B) an alkyl diphenyl ether disulfonate salt. The alkyl diphenyl ether disulfonate salt (B) is present in the composition in the range of 0.2–10 parts by weight, with respect to 100 parts by weight of the organopolysiloxane of component (A). The oraganopolysiloxane (A) has the general formula:

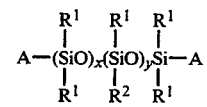

wherein:

$R^1$ is selected from the group consisting of monovalent hydrocarbon radicals having one to seven carbon atoms and combinations thereof;

$R^2$ is selected from the group consisting of a monovalent hydrocarbon radical having eight or more carbon atoms, a monovalent hydrocarbon radical of the general formula $-R^3COOR^4$ wherein $R^3$ is a divalent hydrocarbon radical and $R^4$ is hydrogen or monovalent hydrocarbon radical, a monovalent hydrocarbon radical of the general formula $-R^3OOCR^5$ wherein $R^3$ is a divalent hydrocarbon radical and $R^5$ is a monovalent hydrocarbon radical and combinations thereof;

A is a radical selected from the group consisting of hydroxyl radicals, monovalent hydrocarbon radicals, radicals of the general formula $-R^3COOR^4$ wherein $R^3$ and $R^4$ are as described above, radicals of the general formula $-R^3OOCR^5$ wherein $R^3$ and $R^5$ are as described above, and combinations thereof; and x is an integer between 1 and 50, inclusive;

y is an integer between 10 and 450, inclusive; and $x < y$.

It is therefore an object of the present invention to provide a novel silicone emulsion composition that is useful as a mold coating in aluminum die casting.

It is another object of the present invention to provide a novel silicone emulsion composition which has high stability when diluted with water and subjected to mechanical shear.

Still another object of the invention is to provide a novel silicone emulsion composition which, when applied to a preheated mold so that the water is driven from the emulsion, forms a uniform oil film thereon, which film has good paintability and extreme-pressure lubricity.

These and other objects and features of the present invention will become apparent to those skilled in the art from the following detailed description of the invention and examples thereof.

DETAILED DESCRIPTION OF THE INVENTION

In accordance with the invention there is provided a novel silicone emulsion composition which is useful as a mold coating in aluminum die casting. The silicone emulsion composition of the invention comprises: (A) an aqueous emulsion of an organopolysiloxane; and (B) an alkyl diphenyl ether disufonate salt.

The aqueous emulsion of component (A) is prepared by uniformly dispersing the organopolysiloxane of the following general formula in water, together with an emulsifier:

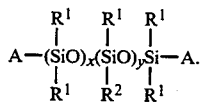

In the aforementioned formula, $R^1$ is selected from the group consisting of monovalent hydrocarbon radicals having one to seven carbon atoms and combinations thereof. Examples include methyl radical, ethyl radical, propyl radical, butyl radical, pentyl radical, hexyl radical, heptyl radical, and other alkyl radicals; phenyl radical, tolyl radical, and other aryl radicals; cyclopentyl radical, methylcyclopentyl radical, cyclohexyl radical, cycloheptyl radical, and other cycloalkyl radicals, etc. When the silicone emulsion composition of this invention is used as the mold releasing agent, it is preferred that at least 50% of $R^1$ radicals in the organopolysiloxane be methyl radicals.

$R^2$ is a monovalent radical selected from the group consisting of monovalent hydrocarbon radicals having eight or more carbon atoms; radicals represented by formula $-R^3COOR^4$ wherein $R^3$ represents a divalent hydrocarbon radical and $R^4$ represents a hydrogen atom or monovalent hydrocarbon radical; radicals represented by formula $-R^3OOCR^5$ wherein $R^3$ represents a divalent hydrocarbon radical and $R^5$ represents a monovalent hydrocarbon radical; and combinations thereof. Examples of monovalent hydrocarbon radicals having 8 or more carbon atoms include octyl radical, nonyl radical, decyl radical, undecyl radical, dodecyl radical, and other alkyl radicals; ethyl phenyl radical, propyl phenyl radical, butyl phenyl radical, and other aryl radicals; phenyl radical, phenyl propyl radical, phenyl butyl radical, and other aralkyl radicals.

In the radicals represented by formula $-R^3COOR^4$, $R^3$ represents divalent hydrocarbon radical, such as an ethylene radical, propylene radical, methylethylene radical, butylene radical, pentylene radical, or other divalent hydrocarbon radical, etc.; $R^4$ represents a hydrogen atom or monovalent hydrocarbon radical, such as a methyl radical, ethyl radical, propyl radical, and other alkyl radicals; phenyl radical, tolyl radical, xylyl radical, and other aryl group, etc.

Consequently, examples of the radicals represented by formula $-R^3COOR^4$ include a carboxymethyl radical, carboxyethyl radical, carboxypropyl radical, and other carboxyalkyl radicals; methoxycarbonylmethyl radical, methoxycarbonylethyl radical, methoxycarbonylpropyl radical, ethoxycarbonylethyl radical, propoxycarbonylethyl radical, butoxycarbonylpropyl radical, and other alkoxycarbonylalkyl radicals, etc.

In the radicals represented by $-R^3OOCR^5$, $R^5$ represents a monovalent hydrocarbon radical, such as a methyl radical, ethyl radical, propyl radical, and other alkyl radicals; phenyl radical, tolyl radical, xylyl radical, and other aryl radicals, etc.

Consequently, examples of the radicals represented by $-R^3OOCR^5$ include an acetyloxymethyl radical, acetyloxyethyl radical, acetyloxypropyl radical, propionyloxyethyl radical, propionyloxypropyl radical, butylyloxypropyl radical, and other acyloxyalkyl radicals, etc.

In the aforementioned formula, A represents a radical selected from the group consisting of hydroxyl radicals; monovalent hydrocarbon radicals; radicals represented by formula $-R^3COOR^4$ wherein $R^3$ represents divalent a hydrocarbon radical and $R^4$ represents a hydrogen atom or monovalent hydrocarbon radical; radicals represented by formula $-R^3OOCR^5$ wherein $R^3$ represents a divalent hydrocarbon radical and $R^5$ represents a monovalent hydrocarbon radical; and combinations thereof.

Examples of the monovalent hydrocarbon radicals are the same as above.

Examples of the radicals represented by formula $-R^3COOR^4$ are the same as listed above.

Examples of the radicals represented by formula $-R^3OOCR^5$ are the same as listed above.

In the aforementioned formula, x represents an integer in the range of 1–50; y represents an integer in the range of 10–450, with $x<y$. This is because if x becomes larger than 50, the paintability property of the oil film formed from the composition of the invention is degraded. If y is smaller than 10, the paintability is also degraded.

On the other hand, if y is larger than 450, the mechanical stability of the composition of this invention is degraded.

If $(x+y)$ becomes larger than 500, the viscosity of the organopolysiloxane is increased, making it difficult to perform emulsification.

In order to improve the paintability of the oil film produced from the emulsion of the inventions, it is necessary to have $x<y$. It is preferred that $R^2$ represent the radical represented by the formula $-R^3COOR^4$ or the radical represented by formula $-R^3OOCR^5$. $R^3$ represent an alkylene radical, $R^4$ represent a hydrogen atom or alkyl radical, $R^5$ represent an alkyl radical, and the carbon atom numbers in $R^3$, $R^3+R^4$, $R^3+R^5$ are larger than 10 for the organopolysiloxane used. In this case, the organopolysiloxane is oriented on the surface of the mold, and the mold releasing property is particularly good.

There is no special limitation the manufacturing method of the aforementioned organopolysiloxane. For example, the following method may be used: in the presence of chloroplatinic acid or other catalyst for the hydrosilylation reaction, methylhydrogenpolysiloxane or a dimethylsiloxanemethylhydrogensiloxane copolymer is added with the α-olefin or α-methylstyrene represented by the following formulas:

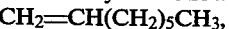
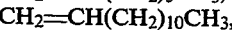
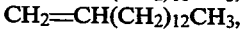

or unsaturated fatty acid represented by the following formulas

or the ester compound of unsaturated fatty acid represented by the following formulas:

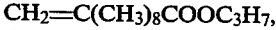
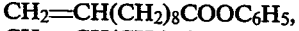
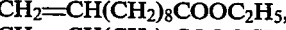
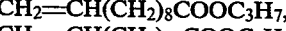
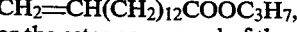

or the ester compound of the unsaturated aliphatic alcohol represented by the formulas:

CH$_2$=CHCH$_2$OOCC$_6$H$_5$,
CH$_2$=CHCH$_2$OOCC$_{11}$H$_{23}$,
CH$_2$=CH(CH$_2$)$_5$OOCC$_{11}$H$_{23}$.

The aqueous emulsion of component (A) can be manufactured by dispersing the aforementioned organopolysiloxane uniformly in water with the aid of an emulsifier. According to this invention, there is no special limitation on the type of the emulsion used. Examples of the emulsifiers that may be used include nonionic surfactants, anionic surfactants, etc. Examples of the nonionic surfactants include polyoxyalkylene alkyl ethers; polyoxyalkylene alkyl phenyl ethers; polyoxyalkylene alkylesters; polyoxyalkylene sorbitan alkyl esters; sorbitan alkyl esters; polyethylene glycol; polypropylene glycol, etc. Examples of anionic surfactants include octylbenzene sulfonic acid, dodecylbenzene sulfonic acid, and other alkylbenzene sulfonic acids; higher alcohol sulfuric ester; polyoxyethylene alkyl ether sulfuric ester; sodium salt, potassium salt, lithium salt, or ammonium salt, etc. of alkylnaphthyl sulfonic acid; etc. It is also possible to use the alkyl diphenyl ether disulfonate salt of component (B).

The alkyl diphenyl ether disulfonate salt of component (B) is a component for making the silicone emulsion composition of the invention acquire mechanical stability and extreme-pressure lubricating properties. There is no special limitation on the type of the alkyl diphenyl ether disulfonate salt of component (B). For example, the compound represented by the following formula may be used:

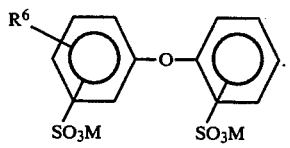

In this formula, R$^6$ represents a C$_{3-20}$ alkyl radical, such as a propyl radical, butyl radical, octyl radical, nonyl radical, decyl radical, dodecyl radical, and other alkyl radicals, or preferably a C$_{8-12}$ alkyl radical. M represents a cation, such as a sodium ion, potassium ion, lithium ion, ammonium ion, etc., or preferably a sodium or potassium ion. Examples of component (B) include butyl diphenyl ether disulfonic acid sodium, nonyl diphenyl ether disulfonic acid sodium, dodecyl diphenyl ether disulfonic acid sodium, dodecyl diphenyl ether disulfonic acid potassium, butyl diphenyl ether disulfonic acid lithium, nonyl diphenyl ether disulfonic acid ammonium, dodecyl diphenyl ether disulfonic acid ammonium and dodecyl diphenyl ether disulfonic acid lithium, etc.

According to this invention, with respect to 100 parts by weight of the organopolysiloxane in component (A), the amount of component (B) should be in the range of 0.2–10 parts by weight, or preferably in the range of 1–6 parts by weight. This is because, if the amount of component (B) is less than 0.2 part by weight with respect to 100 parts by weight of the organopolysiloxane in component (A), the silicone emulsion composition has insufficient mechanical stability and extreme-pressure lubricating properties. On the other hand, if the amount is over 10 parts by weight, the silicone emulsion composition has poor storage stability, the relative concentration of organopolysiloxane is decreased, and the mold releasing properties of the oil film obtained from the emulsion of the invention is degraded.

While the silicone emulsion composition of this invention has components (A) and (B) as the main components, it also may contain additives. Such additives may include preservatives, fungicides, rust inhibitors, coloring agents, mineral oils, higher fatty acids, thickeners, aluminum powder, graphite, etc.

There is no special limitation on the method of manufacturing the silicone emulsion composition of the present invention. The conventional silicone emulsion composition manufacturing method may be used. More specifically, the aforementioned components may be emulsified by using homomixer, colloid mill, line mixer, homogenizer, and other emulsifying apparatus.

The silicone emulsion composition of this invention has excellent mechanical stability and the oil film produced therefrom has extreme-pressure lubricating properties. For example, the silicon emulsion composition may be used in making a mold releasing agent in an aluminum die-casting operation where the emulsion is subjected to repeated mechanical shear force and an oil film having good extreme-pressure lubricating properties is required.

APPLICATION EXAMPLES

The present invention will be explained with reference to the following application examples. In these application examples, "parts" refers to parts by weight, and % represents wt %. The viscosity refers to centistokes measured at 25° C. The structural formulas and viscosity values of the types of organopolysiloxane used in the application examples are listed below:

(I) With viscosity of 1130 cs

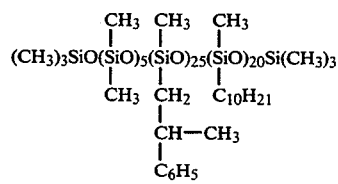

(II) With viscosity of 980 cs

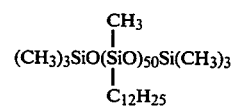

(III) With viscosity of 1630 cs

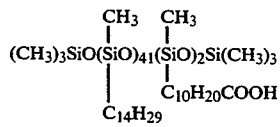

(IV) With viscosity of 1040 cs

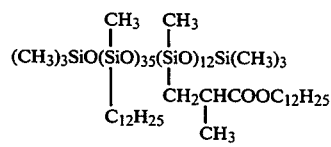

(V) With viscosity of 1320 cs

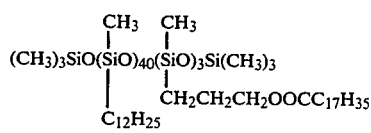

In addition, the types of the alkyl diphenyl ether disulfonate salts used in the application examples are as follows:

(a) Nonyl diphenyl ether disulfonic acid sodium,
(b) Dodecyl diphenyl ether disulfonic acid sodium, and
(c) Dodecyl diphenyl ether disulfonic acid potassium.

In the application examples and comparative examples, the silicone emulsion compositions were assessed using the following methods:

Paintability: The silicone emulsion composition was diluted 50 times by water. The diluted solution was sprayed on paper by means of a simple spray gun, followed by drying at room temperature. Then, equidistant lines were drawn by means of a rule using a felt pen for drawing oily fat lines. The quality of the lines was then evaluated.

o: The lines were not coarse at all, and the ink was attached uniformly.

Δ: The lines were partially coarse, and the ink attachment was a little uneven.

X: The lines were significantly coarse.

Mold releasing property: The silicone emulsion composition was diluted to a concentration of organopolysiloxane of 2% was sprayed on a mold, which mold had inner dimensions of 5 cm×5 cm and a depth of 5 mm, and which mold had many grooves on its bottom, followed by preheating at about 350° C. Molten aluminum heated to about 750° C. in an electric oven was poured into this mold, followed by cooling. Then, the aluminum piece was peeled off from the mold, and the peeling performance was assessed.

⊙: The mold releasing property was excellent.
o: The mold releasing property was good.
Δ: The mold releasing property was a little poor.
X: The mold releasing agent was poor.

Storage stability: 180 mL of the silicone emulsion composition was loaded into a 200 mL glass bottle, followed by setting undisturbed at a room temperature of 25° C. for 3 months to study the storage stability.

Mechanical stability: The silicone emulsion composition was diluted with water to a concentration of organopolysiloxane of 0.5%. Then, 600 g of the diluted solution was loaded into a 1000 mL beaker, followed by stirring at 10000 rpm for 1 h using a homomixer. Then, the sample was left undisturbed for 3 h, and inspected for the attachment of the oil-like substance on the wall of the beaker, the presence/absence of oil-like substance on the surface of the solution, and the presence/absence of cream-like substance.

o: No oil-like substance on the surface of the solution, and no cream-like substance were observed.

: A little oil-like substance on the surface of the solution, and a little cream-like substance were observed.

Δ: Oil-like substance floating on a portion of the surface of the solution, and cream-like substance on the entire surface of the solution were observed.

X: Oil-like substance floating on entire surface of the solution, and a large amount of cream-like substance were observed.

Extreme-pressure lubricating properties: According to the Lubricating Oil Load Test Method defined in JIS-K-2519, the seize load (kg) was evaluated. The measurement conditions and the measurement equipment specifications are as follows.

Form and name: 4-ball type friction tester (produced by Kobe Steel Equipment Mfg. Co., Ltd.)
Test steel balls: ¾" steel ball bearings (basic diameter of 19.05 mm)
Higher rank: JIS-B-1501.
Load on the test steel balls: Max. 1000 kg
Rotating speed of spindle: 750 rpm

APPLICATION EXAMPLE 1

50 parts of organopolysiloxane (I) and 4 parts of polyoxyethylene (6 mol) lauryl ether were dispersed uniformly by means of a stirrer. Then, 4 parts of water were added, followed by stirring and emulsification using a colloid type emulsifier. Then, 39 parts of water were added to form the aqueous emulsion of organopolysiloxane (I). Then, 1.5 parts of alkyl diphenyl ether disulfonate salt (a)-(c) were added into the aforementioned aqueous emulsion, forming three types of silicone emulsion compositions, respectively. For the obtained samples of silicone emulsion compositions, the paintability, mold releasing property, storage stability and extreme-pressure lubricating property were studied. The results are listed in Table I.

TABLE I

| Item Measured | This Invention | | |
|---|---|---|---|
| Alkyl Diphenyl Ether Disulfonate Salt | A | B | C |
| Paintability | o | o | o |
| Mold Releasing Property | ⊙ | ⊙ | ⊙ |
| Storage Stability | Good | Good | Good |
| Mechanical Stability | ⊙ | ⊙ | ⊙ |
| Extreme-Pressure Lubricating Property | 100 | 110 | 110 |
| General Assessment | Appropriate | Appropriate | Appropriate |

COMPARATIVE EXAMPLE 1

Silicone emulsion compositions were prepared in the same way as in Application Example 1 except that the alkyl diphenyl ether disulfonate salt added in Application Example 1 was not added, while water was added instead, and the following listed emulsifiers were added, respectively. The properties of these compositions were measured in the same way as in Application Example 1. The results are listed in Table II.

(d) Sodium laurylsulfate
(e) Polyoxyethylene (4 mol) lauryl ether sulfuric acid sodium
(f) Polyoxyethylene (4 mol) nonyl phenyl ether sulfuric acid sodium
(g) Dodecylbenzene sulfonic acid sodium

TABLE II

| Item Measured | Comparative Examples | | | | |
|---|---|---|---|---|---|
| Emulsifier | Not Added | d | e | f | g |
| Paintability | o | o | o | o | o |
| Mold Releasing Property | Δ~o | Δ~o | Δ~o | Δ~o | Δ~o |
| Storage Stability | Good | Good | Good | Good | Good |
| Mechanical Stability | Δ~o | o~⊙ | o~⊙ | ⊙ | ⊙ |
| Extreme-Pressure Lubricating | 70 | 70 | 80 | 70 | 80 |

TABLE II-continued

| Item Measured | Comparative Examples | | | | |
|---|---|---|---|---|---|
| Property General Assessment | Insufficient | Insufficient | Insufficient | Insufficient | Insufficient |

APPLICATION EXAMPLE 2

4 parts of polyoxyethylene (6 mol) lauryl ether and 0.5 part of dodecylbenzene sulfonic acid sodium were added into 50 parts of organopolysiloxane (II), (III), and (IV), followed by stirring to a uniform state using a stirrer. Then, 5 parts of water were added, followed by stirring and emulsification using a colloid mill type emulsifier. Then, 38.5 parts of water were added to form an aqueous emulsion. 2 parts of dodecyl diphenyl ether sulfonic acid sodium were added into the obtained aqueous emulsion to form the silicone emulsion composition. The properties of the composition were measured in the same way as in Application Example 1, with results listed in Table III.

TABLE III

| Item Measured | This Invention | | |
|---|---|---|---|
| Organopolysiloxane | II | III | IV |
| Emulsifier | b | b | b |
| Paintability | ○ | ○ | ○ |
| Mold Releasing Property | ⊚ | ⊚ | ⊚ |
| Storage Stability | Good | Good | Good |
| Mechanical Stability | ⊚ | ⊚ | ⊚ |
| Extreme-Pressure Lubricating Property | 110 | 120 | 120 |
| General Assessment | Appropriate | Appropriate | Appropriate |

COMPARATIVE EXAMPLE 2

Four types of silicone emulsion compositions were prepared in the same way as in Application Example 2 except that the following listed emulsifiers were used in place of the dodecyl diphenyl ether disulfonic acid sodium used in Application Example 2. The characteristics of these silicone emulsion compositions were measured in the same way as in Application Example 1. The results are listed in Table IV and Table V.

(h) polyoxyethylene (6 mol) lauryl ether
(i) polyoxyethylene (9.5 mol) nonyl phenyl ether
(j) polyoxyethylene (10 mol) monostearate
(k) decaglyceryl monoleate

TABLE IV

| Item Measured | Comparative Examples | | | | | |
|---|---|---|---|---|---|---|
| Organopolysiloxane | II | III | V | II | III | V |
| Emulsifier | h | h | h | i | i | i |
| Paintability | ○ | ○ | ○ | ○ | ○ | ○ |
| Mold Releasing Property | Δ | Δ~○ | Δ~○ | Δ~○ | Δ~○ | Δ~○ |
| Storage Stability | Good | Good | Good | Good | Good | Good |
| Mechanical Stability | Δ~○ | ○ | Δ~○ | ○ | Δ~○ | ○ |
| Extreme-Pressure Lubricating Property | 70 | 80 | 70 | 60 | 70 | 70 |
| General Assessment | Insufficient | Insufficient | Insufficient | Insufficient | Insufficient | Insufficient |

TABLE V

| Item Measured | Comparative Examples | | | | | |
|---|---|---|---|---|---|---|
| Organopolysiloxane | II | III | V | II | III | V |
| Emulsifier | j | j | j | k | k | k |
| Paintability | ○ | ○ | ○ | ○ | ○ | ○ |
| Mold Releasing Property | Δ~○ | Δ | Δ~○ | Δ | Δ~○ | Δ~○ |
| Storage Stability | Good | Good | Good | Good | Good | Good |
| Mechanical Stability | ○ | ○ | Δ~○ | Δ~○ | Δ~○ | Δ~○ |
| Extreme-Pressure Lubricating Property | 70 | 80 | 80 | 70 | 80 | 70 |
| General Assessment | Insufficient | Insufficient | Insufficient | Insufficient | Insufficient | Insufficient |

APPLICATION EXAMPLE 3

Five types of silicone emulsion compositions were prepared in the same way as in Application Example 1 except that instead of the organopolysiloxane (I) used in Application Example 1, organopolysiloxane (IV) was used, and that with respect to 100 parts by weight of organopolysiloxane (IV), 0.1 part, 1 part, 3 parts, 6 parts, and 15 parts of dodecyl diphenyl ether sulfonic acid sodium were added, respectively. In addition, a type of silicone emulsion composition was prepared in the same way as above but without adding dodecyldiphenyl ether sulfonic acid sodium. The characteristics of these silicone emulsion compositions were measured in the same way as in Application Example 1, with results listed in Table VI. It can be seen from these results that the silicone emulsion composition of this invention has excellent mechanical stability, extreme-pressure lubricating properties and paintability. On the other hand, the silicone emulsion composition prepared by adding 0.1 part of dodecyl diphenyl ether disulfonate sodium has insufficient mechanical stability and extreme-pressure lubricating properties. For the silicone emulsion composition prepared by adding 15 parts of dodecyl diphenyl ether disulfonate sodium, the storage stability and the mold releasing property were poor.

TABLE VI

| Item Measured | Application Example | | | Comparative Example | | |
|---|---|---|---|---|---|---|
| Dodecyl Diphenyl Ether Disulfonate Sodium | 1 Part | 3 Parts | 6 Parts | Not Added | 0.1 Part | 15 Parts |
| Paintability | ○ | ○ | ○ | ○ | ○ | ○ |
| Mold Releasing Property | ⊚ | ⊚ | ⊚ | Δ~○ | Δ~○ | Δ |
| Storage Stability | Good | Good | Good | Good | Good | Poor |
| Mechanical Stability | ⊚ | ⊚ | ⊚ | Δ | Δ~○ | ⊚ |
| Extreme-Pressure Lubricating Property | 110 | 120 | 130 | 70 | 70 | 130 |
| General Assessment | Appropriate | Appropriate | Appropriate | Insufficient | Insufficient | Insufficient |

What is claimed is:

1. A silicone emulsion composition consisting essentially of:
   (A) an aqueous emulsion of an organopolysiloxane, said oragnaopolysiloxane having the general formula:

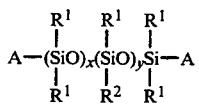

wherein
   $R^1$ is selected from the group consisting of monovalent hydrocarbon radicals having one to seven carbon atoms; and combinations thereof;
   $R^2$ is selected from the group consisting of
   a monovalent hydrocarbon radical having eight or more carbon atoms;
   a monovalent hydrocarbon radical of the general formula $-R^3COOR^4$ wherein $R^3$ is a divalent hydrocarbon radical and $R^4$ is hydrogen or a monovalent hydrocarbon radical;
   a monovalent hydrocarbon radical of the general formula $-R^3OOCR^5$ wherein $R^3$ is a divalent hydrocarbon radical and $R^5$ is a monovalent hydrocarbon radical; and combinations thereof;
   A is a radical selected from the group consisting of hydroxyl radicals;
   monovalent hydrocarbon radicals;
   radicals of the general formula $-R^3COOR^4$ wherein $R^3$ and $R^4$ are as described above;
   radicals of the general formula $-R^3OOCR^5$ wherein $R^3$ and $R^5$ are as described above; and combinations thereof;
   x is an integer between 1 and 50, inclusive;
   y is an integer between 10 and 450, inclusive; and
   x<y; and
   (B) an alkyl diphenyl ether disulfonate salt; and
   said component (B) being present in said composition in the range of 0.2–10 parts by weight, with respect to 100 parts by weight of said organopolysiloxane of component (A).

2. A composition in accordance with claim 1 wherein at least 50% of said $R^1$ radicals are methyl radicals.

3. A composition in accordance with claim 1 wherein said component (B), said alkyl diphenyl ether disulfonate salt, has the general formula:

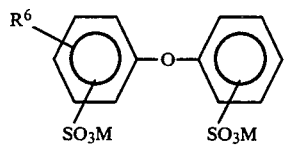

wherein:
   $R^6$ is a monovalent alkyl radical having from 3 to 20 carbon atoms; and M is a cation.

4. A composition in accordance with claim 3 wherein $R^6$ is a monovalent alkyl radical having from 8 to 12 carbon atoms.

5. A composition in accordance with claim 3 wherein M is a cation selected from the group consisting of potassium ions, lithium ions; ammonium ions, and combinations thereof.

6. A composition in accordance with claim 1 wherein said component (B), said alkyl diphenyl ether disulfonate salt, is selected from the group consisting of butyl diphenyl ether disulfonic acid sodium; nonyl diphenyl ether disulfonic acid sodium; dodecyl diphenyl ether disulfonic acid sodium; dodecyl diphenyl ether disulfonic acid potassium; butyl diphenyl ether disulfonic acid lithium; nonyl diphenyl ether disulfonic acid ammonium; dodecyl diphenyl ether disulfonic acid ammonium; dodecyl diphenyl ether disulfonic acid lithium; and combinations thereof.

7. A composition in accordance with claim 1 further comprising an emulsifier.

8. A composition in accordance with claim 7 wherein said emulsifier is selected from the group consisting of polyoxyalkylene alkyl ethers; polyoxyalkylene alkyl phenyl ethers; polyoxyalkylene alkylesters; polyoxyalkylene sorbitan alkyl esters; sorbitan alkyl esters; polyethylene glycol; polypropylene glycol; octylbenzene sulfonic acid; dodecylbenzene sulfonic acid; higher alcohol sulfuric ester; polyoxyethylene alkyl ether sulfuric ester; and a sodium salt, potassium salt, lithium salt, or ammonium salt of alkylnaphthyl sulfonic acid.

* * * * *